United States Patent
Hall et al.

(10) Patent No.: US 10,235,192 B2
(45) Date of Patent: Mar. 19, 2019

(54) SELF-LEARNING ROBOTIC PROCESS AUTOMATION

(71) Applicant: Accenture Global Solutions Limited, Dublin (IE)

(72) Inventors: Simon Hall, Noord-Holland (NL); Vitalie Schiopu, Bertrange (LU); Jeroen van den Heuvel, Amsterdam (NL); Adrien Jacquot, Antibes Juan-les-Pins (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/632,099

(22) Filed: Jun. 23, 2017

(65) Prior Publication Data
US 2018/0370029 A1    Dec. 27, 2018

(51) Int. Cl.
*G06F 11/36*    (2006.01)
*G06F 9/451*    (2018.01)
(Continued)

(52) U.S. Cl.
CPC ............ *G06F 9/451* (2018.02); *G06F 3/0482* (2013.01); *G06F 3/04817* (2013.01); *G06F 11/3696* (2013.01); *G06N 99/005* (2013.01)

(58) Field of Classification Search
CPC .... G06F 3/048; G06F 3/0481; G06F 3/04817; G06F 3/0482; G06F 3/0484;
(Continued)

(56) References Cited

U.S. PATENT DOCUMENTS

| 4,825,394 A | 4/1989 | Beamish et al. |
| 7,437,614 B2 | 10/2008 | Haswell et al. |

(Continued)

FOREIGN PATENT DOCUMENTS

EP    3364299    8/2018

OTHER PUBLICATIONS

Gao et al., "SITAR: GUI Test Script Repair", IEEE Transactions on Software Engineering, No. 1, pp. 1, PrePrints PrePrints, doi:10.1109/TSE.2015.2454510, 19 pages.*

(Continued)

*Primary Examiner* — Gabriel Chu
(74) *Attorney, Agent, or Firm* — Fish & Richardson P.C.

(57) ABSTRACT

Methods, systems, and apparatus, including computer programs encoded on a computer storage medium, for a self-learning robotic process automation are disclosed. In one aspect, a method includes receiving an automated script that includes one or more commands and that is configured to interact with graphical elements that appear on a user interface. The method further includes executing a command of the one or more commands of the automated script. The method further includes determining that an error occurred during execution of the command of the one or more commands of the automated script. The method further includes determining a modification for the command by applying a script repair model. The method further includes executing the modified command. The method further includes determining whether the error or another error occurred during execution of the modified command. The method further includes determining whether to update the automated script with the modified command.

21 Claims, 5 Drawing Sheets

(51) Int. Cl.
 *G06N 99/00* (2019.01)
 *G06F 3/0481* (2013.01)
 *G06F 3/0482* (2013.01)
 *G06F 11/00* (2006.01)

(58) Field of Classification Search
 CPC ............ G06F 3/04842; G06F 3/04845; G06F 11/0793; G06F 11/1402; G06F 11/1405; G06F 11/3696; G06N 99/005
 See application file for complete search history.

(56) References Cited

U.S. PATENT DOCUMENTS

| | | | |
|---|---|---|---|
| 7,565,607 B2 | 7/2009 | McGlinchey et al. | |
| 8,095,237 B2 | 1/2012 | Habibi et al. | |
| 8,330,811 B2 | 12/2012 | Macguire, Jr. | |
| 8,330,812 B2 | 12/2012 | Maguire, Jr. | |
| 8,504,803 B2 | 8/2013 | Shukla | |
| 8,559,699 B2 | 10/2013 | Boca | |
| 8,793,578 B2 | 7/2014 | Mounty et al. | |
| RE45,062 E | 8/2014 | Maguire, Jr. | |
| RE45,114 E | 9/2014 | Maguire, Jr. | |
| 9,367,379 B1 | 6/2016 | Burke et al. | |
| 9,430,356 B2 | 8/2016 | Gao et al. | |
| 9,462,042 B2 | 10/2016 | Shukla et al. | |
| 9,954,819 B2 | 4/2018 | Kakhandiki et al. | |
| 2001/0044661 A1 | 11/2001 | Kaji et al. | |
| 2003/0236775 A1* | 12/2003 | Patterson | G06F 9/4443 |
| 2004/189675 A1 | 9/2004 | Pretlove et al. | |
| 2005/0069207 A1 | 3/2005 | Zakrzewski et al. | |
| 2005/0120347 A1 | 6/2005 | Asare et al. | |
| 2005/0154740 A1* | 7/2005 | Day | G06F 17/30474 |
| 2005/0193269 A1 | 9/2005 | Haswell et al. | |
| 2006/0119572 A1 | 6/2006 | Lanier | |
| 2007/0127101 A1 | 6/2007 | Oldroyd et al. | |
| 2009/0037024 A1 | 2/2009 | Jamieson et al. | |
| 2009/0070742 A1 | 3/2009 | Voruganti | |
| 2009/0288070 A1* | 11/2009 | Cohen | G06F 11/366 717/125 |
| 2010/0222957 A1 | 9/2010 | Ohta et al. | |
| 2011/0015649 A1 | 1/2011 | Anvari et al. | |
| 2011/0276396 A1 | 11/2011 | Rathod | |
| 2011/0307864 A1* | 12/2011 | Grechanik | G06F 11/3604 717/124 |
| 2012/0095619 A1 | 4/2012 | Pack et al. | |
| 2012/0197439 A1 | 8/2012 | Wang et al. | |
| 2012/0243745 A1* | 9/2012 | Amintafreshi | G06F 11/3688 382/103 |
| 2013/0078600 A1 | 3/2013 | Fischer et al. | |
| 2013/0104106 A1 | 4/2013 | Brown et al. | |
| 2013/0178980 A1 | 7/2013 | Chemouny et al. | |
| 2013/0335405 A1 | 12/2013 | Scavezze et al. | |
| 2013/0345875 A1 | 12/2013 | Brooks et al. | |
| 2014/0053021 A1* | 2/2014 | Schwartz | G06F 9/45512 714/15 |
| 2014/0129942 A1 | 5/2014 | Rathod et al. | |
| 2014/0222023 A1 | 8/2014 | Kim et al. | |
| 2014/0244831 A1 | 8/2014 | Berkovich et al. | |
| 2014/0282434 A1 | 9/2014 | Eilam et al. | |
| 2014/0369558 A1 | 12/2014 | Holz | |
| 2014/0376777 A1 | 12/2014 | Churchill et al. | |
| 2015/0012919 A1 | 1/2015 | Moss et al. | |
| 2015/0074645 A1 | 3/2015 | Herrin et al. | |
| 2015/0096876 A1 | 4/2015 | Mittleman et al. | |
| 2015/0234701 A1* | 8/2015 | Irani | G06F 11/0793 714/15 |
| 2015/0287310 A1 | 10/2015 | DeIuliis et al. | |
| 2016/0019049 A1 | 1/2016 | Kakhandiki et al. | |
| 2016/0078368 A1 | 3/2016 | Kakhandiki et al. | |
| 2016/0167226 A1 | 6/2016 | Schnittman et al. | |
| 2016/0342501 A1 | 11/2016 | Venkatesan et al. | |
| 2017/0060108 A1 | 3/2017 | Kakhandiki et al. | |
| 2017/0228220 A1* | 8/2017 | Dai | G06F 8/38 |
| 2018/0004823 A1 | 1/2018 | Kakhandiki et al. | |
| 2018/0165264 A1* | 6/2018 | Venkataraman | G06F 8/65 |

OTHER PUBLICATIONS

European Search Report in European Application No. 18170688.8, dated Sep. 4, 2018, 4 pages.

* cited by examiner

SELF-LEARNING ROBOTIC PROCESS AUTOMATION

TECHNICAL FIELD

This application generally relates to machine learning.

BACKGROUND

Manual processes performed on a computer may be repetitive and time consuming. For example, a user may send e-mails in response to web form submissions, and for each web form submission, may need to manually interact with a computer to click buttons to open a window for composing a new e-mail, click buttons to copy information from the web form submission into the window, click keys to write text for a body of the e-mail, and click buttons to send the e-mail.

SUMMARY

Front-end scripts typically interact with the user interface of a system. For example, a front-end script may locate an icon that is on a screen using computer vision techniques. The front-end script may select the icon to initialize the corresponding application or to open the corresponding document. In contrast, a back-end script instructs the computing system to open a certain application using the path of the executable file for the application. A front-end script may be preferable because it offers more flexibility than a back-end script. Nearly every system that a user interacts with has a front-end. While nearly every system also has a back-end, some system may not allow other systems to interact with the back-end to initiate applications and open files.

Front-end scripts may be more prone to errors. An error may be caused by an unexpected change to the user interface. During generation of a script, the system may capture a screen shot of the portion of the user interface where the user clicks on or touches the user interface. The size of the captured portion may be a fixed size. During execution of the script, the system may scan the user interface to locate an area of the screen that matches the captured portion. If a pop up window appears on the screen, then the system may be unable to find an area of the screen that matches the captured portion. In this instance, the system may apply a script repair model to the error. The system may have previously trained the script repair model using user interactions, other scripts, and outcomes from those other scripts. The script repair model analyzes the error and the screen and identifies the close button of the pop-up window or the cancel button of the pop-up window. The script repair model may instruct the system to select the close button.

The system may repeat scanning of the user interface to locate an area of the screen that matches the captured portion. With the pop-up window closed, the system may be able to successful locate an area that matches the captured portion. The system may update the script to include an action to locate the close button of a pop-up window in the event of an error in locating the captured portion. The action may be an optional action that the system performs if it detects a pop-up window. In some implementations, the system may also update other scripts. For example, the system may update other scripts that scan the user interface and to locate an area of the screen similar to the captured portion. The system may add a similar optional step to those other scripts.

According to an innovative aspect of the subject matter described in this application, a method for self-learning robotic process automation includes the actions of receiving, by a computing device, an automated script that includes one or more commands and that is configured to interact with graphical elements that appear on a user interface; executing, by the computing device, a command of the one or more commands of the automated script; determining, by the computing device, that an error occurred during execution of the command of the one or more commands of the automated script; in response to determining that an error occurred during execution of the command, determining, by the computing device, a modification for the command by applying, to the command, a script repair model that is trained using one or more automated scripts that each include commands and results that correspond to each command; executing, by the computing device, the modified command; determining, by the computing device, whether the error or another error occurred during execution of the modified command; and based on determining whether the error or the other error occurred during execution of the modified command, determining whether to update the automated script with the modified command.

These and other implementations can each optionally include one or more of the following features. The action of determining, by the computing device, whether the error or another error occurred during execution of the modified command includes determining that the error or the other error occurred during execution of the modified command. The action of determining whether to update the automated script with the modified command includes determining not to update the automated script with the modified command. The actions further include determining, by the computing device, an additional modification for the command based on the application of the script repair model to the command. The actions further include, based on determining that the error or the other error occurred during execution of the modified command, updating the script repair model using data indicating that the error or the other error occurred during execution of the modified command. The action of determining, by the computing device, whether the error or another error occurred during execution of the modified command includes determining that the error or the other error did not occur during execution of the modified command.

The action of determining whether to update the automated script with the modified command includes determining to update the automated script with the modified command. The actions further include determining that the error or the other error did not occur during execution of the modified command, updating the script repair model using data indicating that the error or the other error did not occur during execution of the modified command. The actions further include identifying another automated script that includes another command that is similar to the command of the automated script; and updating the other command of the other automated script with the modified command. The action of executing the command of the one or more commands of the automated script includes analyzing, using computer vision, a screen capture of the user interface; based on analyzing the screen capture of the user interface, identifying, in the user interface, an area of the screen that likely matches a graphical element that is specified by the automated script; and selecting, by the computing device, the area of the screen that matches the graphical element that is specified by the automated script.

The action of determining the modification for the command includes adjusting a size of the area of the screen that likely matches the graphical element that is specified by the automated script. The action of determining, by the computing device, a modification for the command by applying, to the command, a script repair model that is trained using one or more automated scripts that each include commands and results that correspond to each command includes classifying, by the script repair model, the error that occurred during execution of the command of the one or more commands of the automated script; and, based on the classification of the error, determining the modification for the command by applying, to the command, the script repair model. The action of executing, by the computing device, the modified command includes simulating, by the computing device, the modified command. The action of determining, by the computing device, whether the error or another error occurred during execution of the modified command includes determining whether the error or the other error occurred during simulation of the modified command.

The action of determining, by the computing device, a modification for the command by applying, to the command, a script repair model that is trained using one or more automated scripts that each include commands and results that correspond to each command includes determining, by applying the script repair model to the command, for each of one or more candidate modifications, a repair confidence score that reflects a likelihood that applying a respective candidate modification to the command will correct the error; and based on the repair confidence scores, selecting, from among the one or more candidate modifications, the modification for the command. The action of determining whether to update the automated script with the modified command includes determining whether to update the automated script with the modified command using machine learning.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may perform and correct automated front-end scripts. The system may save computing resources by updating other scripts when an error is detected and correct in one script. The system does not need to encounter an error before correcting the error.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
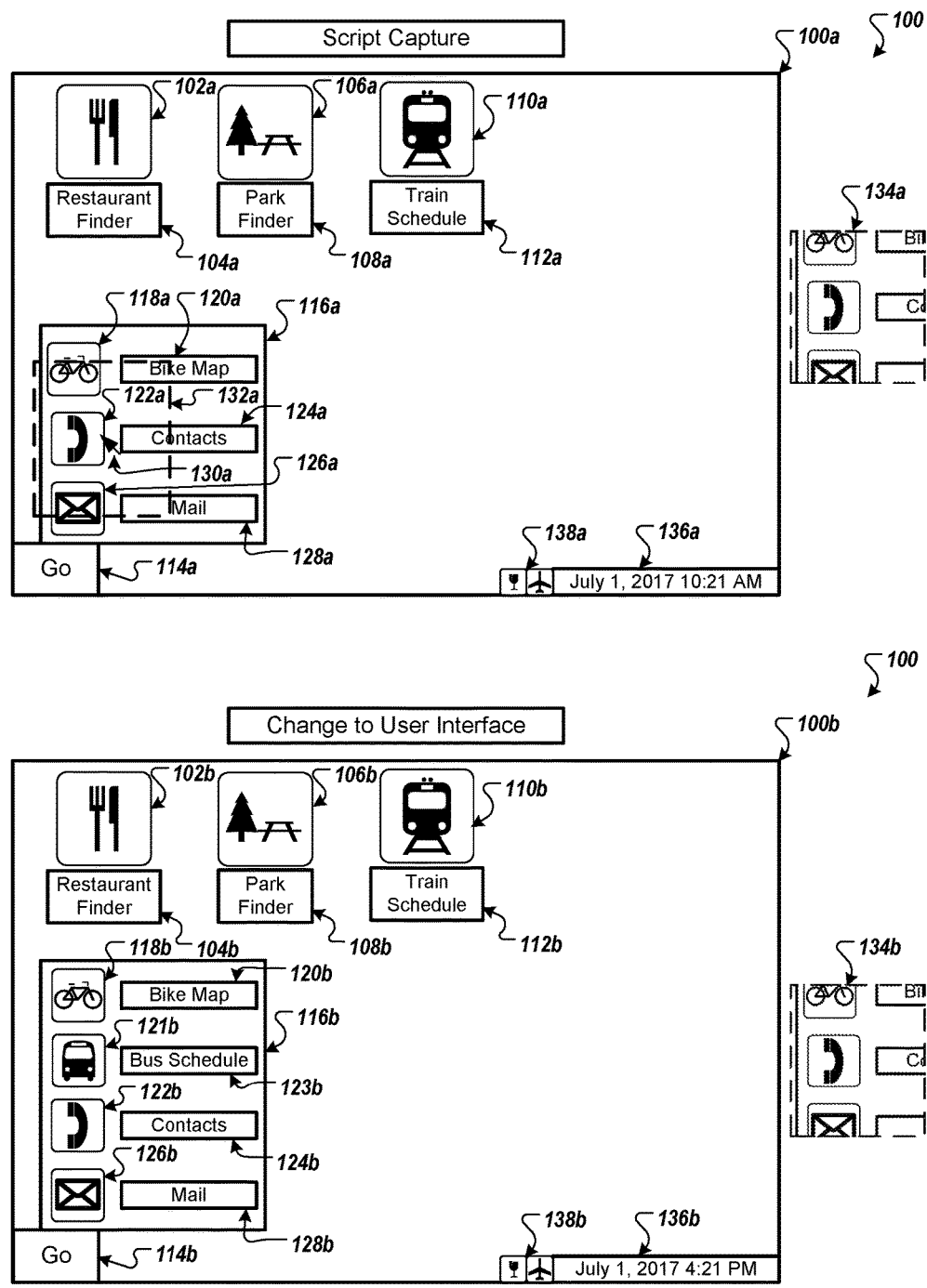
FIGS. 1A and 1B illustrate example graphical interfaces of a system during capture, execution, and modification of an automated script.
Figure 1B:
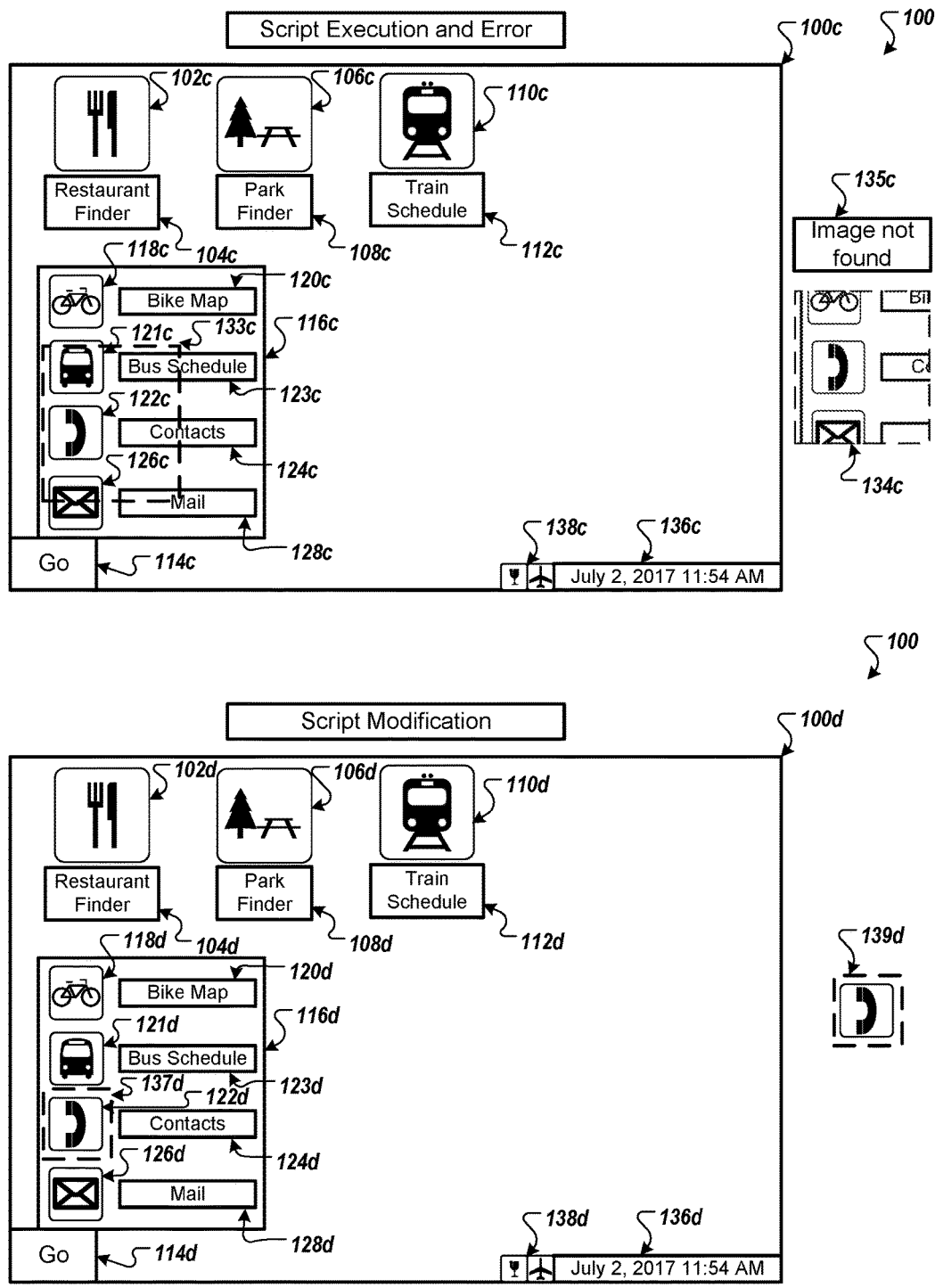

FIGS. 1A and 1B illustrate example graphical interfaces 100a, 100b, 100c, and 100d of a system 100 during capture, execution, and modification of an automated script. Briefly, and as described in more detail below, the graphical interfaces 100a graphical interface 100a illustrates the system 100 capturing a command of a script. Graphical interface 100b illustrates a change to the graphical interface 100b. Graphical interface 100c illustrates the system 100 executing and detecting an error in the script. Graphical interface 100d illustrates the system 100 modifying and updating the script to correct the error by applying a script repair model and cropping an image captured during generation of the script.

In the example shown in FIG. 1A, the graphical interface 100a represents the view presented by the system 100 to the user. The graphical interface 100a may include icons and menus that the user can interact with and select to perform various actions. For example, the user may select the icon 102a to launch an application to find a restaurant. The icon 102a may include a label 104a that describes the icon 102a as the restaurant finder icon. The user may select the icon 106a to launch an application to find a park. The icon 106a may include a label 108a that describes the icon 106a as the park finder icon. The user may select the icon 110a to launch an application to view the train schedule. The icon 110a may include a label 112a that describes the icon 110a as the train schedule icon.

The graphical interface 100a may also include a menu button 114a. The user may select the menu button 114a to display the menu 116a. The menu 116a may include additional icons that the user can interact with and select to perform additional actions. For example, the user can select icon 118a to launch an application that displays a bike map. The icon 118a may include a label 120a that describes the icon 118a as the bike map icon. The user may select icon 122a to launch an application to display the user's contacts. The icon 122a may include a label 124a that describes the icon 122a as a contacts icon. The user may select icon 126a to launch a mail application. The icon 126a may include a label 128a that describes the icon as a mail icon. The user interface 100a may also include date and time information 136a and tray icons 138a.

The user may generate a script by interacting with the graphical interface 100a. The interactions may include clicking a button on a mouse, touching a display, typing on a keyboard, providing voice input, or providing input through any other similar input device. The system 100 stores data related to the script based on where and how the user interacts with the graphical interface 100a. The user may generate a script that include any action or series of actions that the user can perform with the graphical interface 100a.

In the example shown in user interface 100a, the user may be creating a script for selecting and sending a contact from the contacts application. One of the actions of that script may involve the selection of the icon 122a. With the system 100a recording and generating the script, the user may, initially, select the menu button 114a by hovering the mouse pointer 130a over the button 114a and clicking the mouse. The system 100 may record data reflecting the user's interaction with menu button 114a.

With the menu 116a open, the user may select the contacts icon 122a. The user may hover the mouse pointer 130a over the icon 122a and click the mouse. In some implementations, the user may tap the icon 122a with the user's finger in instances where the user interface 100a appears on a touch screen. The clicking of the mouse or the tapping of the finger may trigger the system 100 to record a corresponding action. The recorded data may include the screen coordinates of the mouse pointer 130a when the user clicked the mouse. The recorded data may also include a screen capture around the area 132a of the mouse pointer 130a when the user clicked the mouse.

The captured area 132a may be a fixed area around the mouse pointer 130a. The size of the captured area 132a may correspond to the icons that a user typically selects. In this instance, the size of the captured area 132a may match the size of the icons 102a, 106a, and 110a. The size of the captured area 132a may be consistent across other systems that use the same operating system as the system 100. Other operating systems may have primary icons that are a different size than icons 102a, 106a, and 110a. In some implementations, the size of the captured area 132a may be defined by the user. For example, the user may select a size for any captured area. As another example, the user may select the size of the captured area 132a each time the user clicks the mouse or taps the screen.

In some implementations, the size of the captured area 132a may depend on the location of the mouse pointer 130a when the user clicked the mouse. For example, if the mouse pointer 130a is within the menu 116a, then the captured area 132a may be similar in size to the icons 118a, 122a, and 126a. If the mouse pointer 130a is outside the menu 116a, then the captured area may be similar in size to the icons 102a, 106a, and 110a.

In the example shown in FIG. 1A, the captured area 132a is a constant shape. The system 100 records the image 134a and a selection of the image 134a as an action in the script. In some implementations, the system 100 may store the coordinates of the mouse pointer 130a when the user selected the area of the image 134a. The system 100 may record additional actions as the user interacts with the user interface 100a. The system 100 may store the image 134a, the data related to image 134a, and other images and corresponding information as the script.

In the example shown in FIG. 1A, the graphical interface 100b represents another view presented by the system 100 to the user. The graphical interface 100b may include similar features and icons as the graphical interface 100b. For example, icons 102b, 106b, and 110b may be similar to icons 102a, 106a, and 110a of graphical interface 100a. Icons 118b, 122b, and 126b may be similar to icons 118a, 122a, and 126a of graphical interface 100a. The graphical interface 100b may include button 114b that the user may select to display the menu 116b and may include date and time information 136b and tray icons 138b.

The graphical interface 100b includes a change to the graphical interface 100a. In this instance, the user may have installed on the system 100 additional software for an application that displays bus schedules. The graphical interface 100b includes icon 121b that the user can select to launch the new application that displays bus schedules. The icon 121b may be adjacent to a label 123b that specifies that the icon 121b is for the bus schedule application.

As illustrated in graphical interface 100b, the system 100 placed the bus schedules icon 121b above the contacts icon 122b and below the bike map icon 118b. In some implementations, the user may choose the location of the bus schedule icon 121b. For example, the user may move the bus schedule icon 121b next to the train schedule icon 110b.

Including the new icon 121b in the graphical interface 100b may not affect the commands of the stored script. The script may still include the command related to image 134b. The image 134b includes a screen capture of the area around the mouse pointer when the user clicked the mouse during generation of the script. Including the new icon 121b may not change the image 134b.

In the example shown in FIG. 1B, the graphical interface 100c represents another view presented by the system 100 to the user during the execution of the stored script. The graphical interface 100c may include similar features and icons as the graphical interfaces 100a and 100b. For example, icons 102c, 106c, and 110c may be similar to icons 102a, 106a, and 110a of graphical interface 100a. Icons 118c, 122c, and 126c may be similar to icons 118a, 122a, and 126a of graphical interface 100a. The graphical interface 100c may include button 114c that the user may select to display the menu 116c and may include date and time information 136c and tray icons 138c.

The user instructs the system 100 to execute the stored script for selecting and sending a contact from the contacts application. The system 100 may execute one or more actions of the script before executing the action related to selecting the contacts icon 122c. For example, the script may select the button 114c to display the menu 116c. In performing the action related to selecting the contacts icon 122c, the system may analyze a screen capture of the graphical interface 100c and attempt to locate a portion of the screen capture that matches the image 134c that the system captured when generating the script.

The system 100 may perform computer vision on the screen capture of the graphical interface 100c to locate a portion of the screen that matches image 134c. In some implementations, the system 100 may sweep an area of the screen capture that is near the location where the user clicked the mouse. For example, the system 100 may sweep the area that within two hundred pixels of the mouse click location, which is around icon 122c.

In analyzing the screen capture for a portion of the screen that matches the image 134c, the system 100 may generate image confidence scores that reflect a likelihood that different portion of the screen correspond to the image 134c. For example, the system 100 may analyze an area of the screen that includes icon 110c. In this instance, the system 100 may generate an image confidence score of 0.1. The system 100 may analyze area 133c of the screen capture of the graphical interface 100c. Area 133c may include some similar features to image 134c such as icon 122c, but also includes portions of the new bus schedule icon 121c. The system may generate an image confidence score of 0.7. The system 100 may determine that a portion of the screen matches the image 134c if the image confidence score satisfies a threshold. For example, if the threshold is 0.8, then neither the area 133c or the area of the screen that includes icon 110c have an image confidence score greater the threshold of 0.8. The system 100 may determine that that image 134c is not on the graphical interface 100c.

The system 100 generates an exception 135c during the execution of the script. The system 100 may display the exception 135c on the graphical interface 100c or may provide another type of indication (e.g., an audio indication) to the user that the system 100 encountered an error in executing the script. In some implementations, the outline of area 133c does not appear on the graphical interface 100c.

Instead, the system 100 compares the area 133c to the image 135c without outlining the area 133c.

In the example shown in FIG. 1B, the graphical interface 100d represents another view presented by the system 100 to the user during the modification of the stored script. The graphical interface 100d may include similar features and icons as the graphical interfaces 100a, 100b, and 100c. For example, icons 102d, 106d, and 110d may be similar to icons 102a, 106a, and 110a of graphical interface 100a. Icons 118d, 121d, 122d, and 126c may be similar to icons 118a, 121b, 122a, and 126a of graphical interfaces 100a and 100b. The graphical interface 100d may include button 114d that the user may select to display the menu 116d and may include date and time information 136d and tray icons 138d.

The system 100 detected an error in the script based on being unable to identify a portion of the graphical interface 100c that matched the image 134c. The system 100 attempts to correct the error by accessing a script repair model. The script repair model may be trained to suggest a correction to the script to repair the error. The script repair model may use neural networks and machine learning to recommend a correction. The script repair model may be trained using corrections that repaired other scripts and attempted corrections that did not repair other scripts. The training data may include data related to the outcome of each correction and attempted correction. In some implementations, the training data may include data related to script actions and results for those actions that worked properly and did not generate an error.

The system 100 applies the script repair model to the data related to the error. The data related to the error may include the image 134c, a portion of the graphical interface 100c that had a highest image confidence score (e.g., area 133c), the coordinates of the mouse pointer when the system captured the image 134c, and the coordinates of the portion of the graphical interface 100c that had a highest image confidence score. The script repair model may generate one or more candidate modifications to repair the error. The script repair model may generate a repair confidence score for each of the candidate modifications. The repair confidence score may reflect a likelihood that the candidate modification will correct the error.

In the example shown in graphical interface 100d, the system 100 may determine, using the script repair model, to crop the image 134c. The system 100 may crop the image 134c to generate the cropped image 139d. The script repair model may determine the size of the cropped image 139d by analyzing the location of the original mouse click and the size of images that are successfully matched in the area near the original mouse click. The system 100 may perform computer vision techniques to identify a whole icon that is located in image 134c and is the size of successfully matched images.

The system 100 analyzes the graphical interface 100d for the cropped image 139d. The system 100 identifies image portion 137d as a match for the cropped image 139d. The system 100 continues with the script and selects the image portion 137d. By selecting the image portion 137d, the system 100 opens the contacts application and continues performing the actions of the script.

Figure 2:
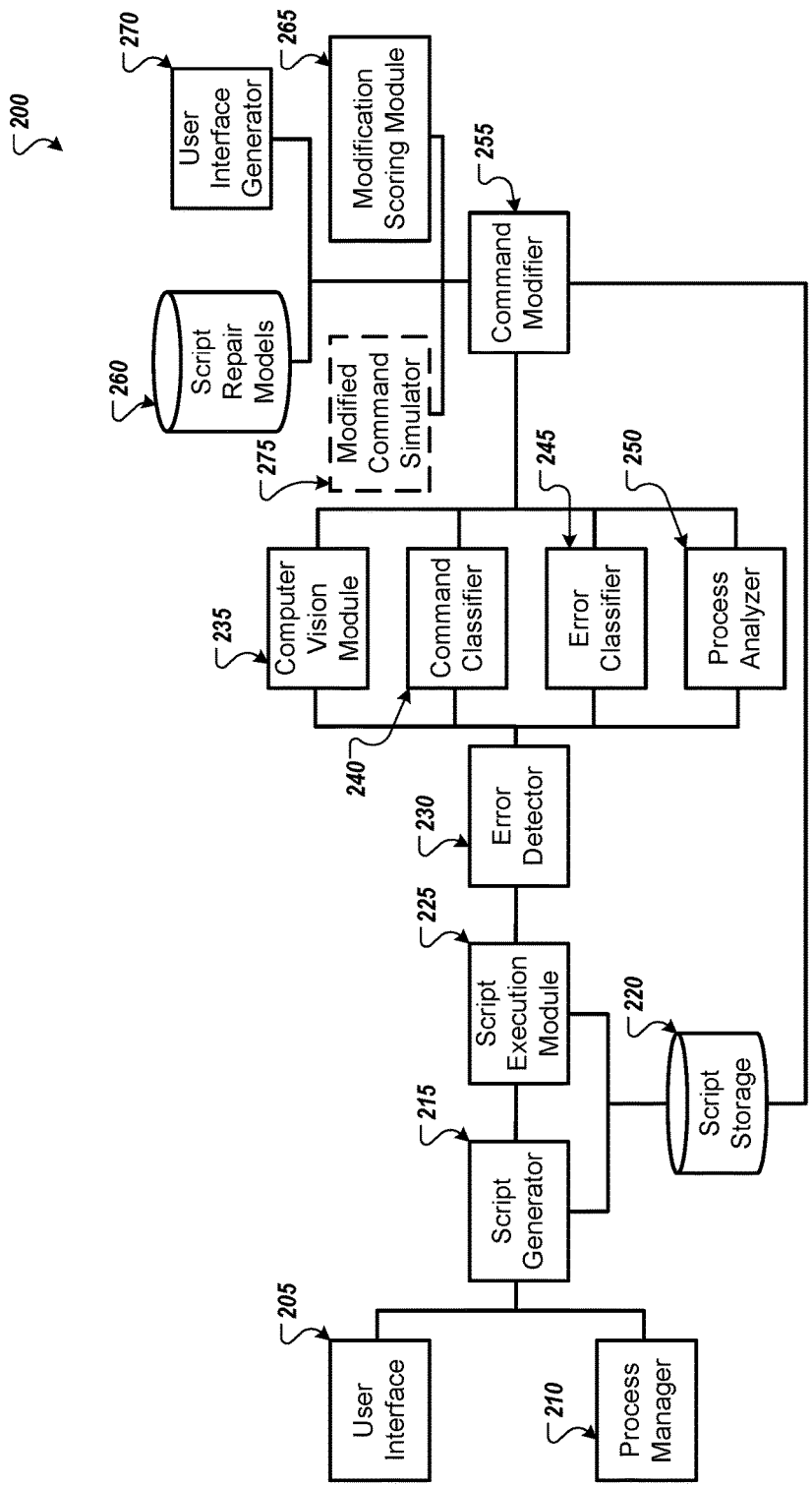
FIG. 2 illustrates an example system for capturing, executing, and modifying automated scripts.

FIG. 2 illustrates an example system 200 for capturing, executing, and modifying automated scripts. Briefly, and as described in more detail below, the system 200 captures a script based on the interactions that a user has with a graphical interface. The system 200 stores the script and executes the stored script by performing the actions that the user performed during capturing of the script. The system 200 may generate an error during execution of a script. The system 200 applies a script repair model to the error and the script to identify a modification to repair the script. The system may be implemented using one or more computing devices.

In the example shown in FIG. 2, the system 200 includes a user interface 205. The user interface 205 may include a display to provide visual output to a user. The user may interact with the user interface 205. For example, the user may touch the display in instances where the display is a touch sensitive display. The user may move a mouse around the user interface 205 and click the mouse to provide input to the system 200. Examples of user interfaces are illustrated in FIGS. 1A and 1B with graphical interfaces 100a, 100b, 100c, and 100d.

The system 200 includes a process manager 210. The process manager 210 keeps track of the processes that are currently running on the system. In some implementations, the process manager 210 may include an interface that allows other software modules to query the process manager 210. For example, the interface may be an API. The other software modules may receive a list of processes currently running on the system 200, how long each process has been running, how much processing capability each process is using, and how much memory each process is using.

The system 200 includes a script generator 215. The script generator 215 may be configured to monitor the user interface 205 and the process manager 210 to identify actions performed by a user during recording of a script. The script generator 215 may also be configured to monitor the input devices such as the mouse, touch screen, keyboard, or other input devices. In some implementations, the script generator 215 may be configured to only monitor the input devices and the user interface 205. In this instance, the script generator 215 may not have access to the process manager 210.

The user provides an instruction to the script generator 215 to begin recording and generating a script. The script generator 215 may begin monitoring the user interface 205 and the processor manager 210. The script generator 215 may record the input provided by the user, the processes running on the system 200, and the graphics displayed on the user interface 205. For example, the script generator 215 may record the user clicking the mouse at a particular spot on the screen. The script generator 215 may record the coordinates of the mouse when clicked, a screen capture of the user interface 205 during the mouse click, the timing of the mouse click, e.g., a timestamp, the processes running after the mouse click, and any other similar information. The script generator 215 may record similar information during each input event. An input event may include a mouse click, touch screen press, keyboard press, or other similar event.

The script generator 215 may store a script in the script storage 220. The script may be based on the recorded data. For the example of the mouse click action, the stored action may include the mouse coordinates, an area of the screen around the mouse click, the elapsed time since the previous action, and any process that likely was initiated by the mouse click. A subsequent action for an event such as a keyboard event may include the key pressed on the keyboard, the time elapsed since the mouse click action, and any processes that likely were initiated by the keyboard press. For the keyboard event, the script generator 215 may also compare a screen capture of the screen before the keyboard press and after the keyboard press. The script generator 215 may be able to determine a location of the cursor by identifying the location of the change in the user interface 205. In this instance, the script generator 215 may store a screen capture of an area of the screen where the cursor was located and where the user likely entered text.

The script execution module 225 may access the script storage 220 to retrieve a script for execution. The script execution module 225 may receive input from a user to retrieve and execute a particular script. For example, the user may request that the system 200 perform the script related to updating the user's contacts. The user may name the scripts and may request a particular script by name.

The script execution module 225 performs the actions of the specified script. The script execution module 225 may navigate the cursor to a portion of the screen that matched the captured image and click the mouse. The script execution module 225 may select a series of keys after clicking the mouse on an area of the screen that matched a captured image, which may have placed a cursor at that location.

In some instances, the script execution module 225 may encounter an error. The error detector 230 may be configured to analyze the actions performed by the script execution module 225 to determine whether an error or exception occurred. In some instances, the script execution module 225 may generate the error if the script execution module 225 is unable to perform an action. For example, the script execution module 225 may be unable to locate an area of the user interface 205 that matches the image of the screen captured by the script generator 215. In this instance, the script execution module 225 may generate the error.

The error detector 230 may provide error data to the computer vision module 235. The computer vision module 235 may be configured to analyze the screen for a location that likely matches the screen captured by the script generator 215. The computer vision module 235 may provide functionality on top of the matching that the script execution module 225 performs. For example, the computer vision module 235 may analyze the text and images of the screen captured by the script generator 215 and compare the text and images to the user interface. The computer vision module 235 may identify the test "conta" in the captured image. The computer vision module 235 may sweep the user interface for the text "conta." The computer vision module 235 may perform edge detection to detect shapes in the captured image and sweep the user interface for similar shapes. The computer vision module 235 may provide data identifying an area of user interface that likely corresponds to the image captured by the script generator 215.

The command classifier 240 may be configured to classify the type of command or action that generated the error. Some example types may include selecting an icon with a mouse, selecting an icon by touching the screen, typing on the keyboard, scrolling the mouse, clicking and dragging the mouse, or any other similar type of action or command. To classify the command, the command classifier 240 may analyze the input for the corresponding command or action. For example, single or double clicking the mouse on an area with strong edges may likely indicate that the user clicked on an icon. Using the mouse wheel may likely indicate that the user is scrolling an area of the screen. The command classifier 240 may identify a likely command type and provide that command type to the command modifier 255.

The error classifier 245 may be configured to classify the type of error generated by the error detector 230. Some example types may include an image location error, an error initializing a process, an unexpected result, or any other similar error. To classify an error, the error classifier 245 may analyze the parameters of the action and any error generated by the error detector 230. For example, an error locating a portion of the screen that corresponds to a captured image may be an image location error. An error may be related to performing an action that the system 200 expects to open a word processing application and the action does not change the processes running on the system 200. The error classifier 245 may identify the type of error and provide the error type to the command modifier 255.

The process analyzer 250 may be configured to monitor the processes that are running during execution of the script. The process analyzer 250 may access the processes through the process manager 210 and compare the processes to the processes expected during execution of the script. When the error detector 230 detects an error, the process analyzer 250 may identify any processes that should have been running or any processes that should not be running or both. The process analyzer 250 may analyze the processes during the actions before the error detector 230 identified the error. The process analyzer 250 may analyze the processes immediately before and after the error detector 230 identified the error. The process analyzer 250 may provide the process data to the command modifier 255.

The command modifier 255 receives data from the computer vision module 235, the command classifier 240, the error classifier 245, and the process analyzer 250 and applies a script repair model that is stored in the script repair model storage 260. The system generates and trains the script repair models using previous data inputted into the system 200. The previous data may include actions that a user has taken to perform a particular task. For example, the data may include actions taken by a user to initiate an application to open a bus schedule application. The data may include multiple series of actions that different users have taken to open a bus schedule application. Some may include opening the bus schedule application from a menu or from the desktop. Some may include closing a pop up window. The previous data may include previous actions and processes that the system 200 has performed.

The system 200 may identify the application opened by the user by performing computer vision on portions of the user interface or by monitoring the processes or both. The previous data may include modifications that the system 200 has applied to other scripts and the outcomes of those modifications. For example, the system 200 may have previously cropped an image and compared the cropped image to the current user interface. The system 200 may train the script repair model using the image crop data and the result that followed, whether the following result included an error or not. The system 200 may also have script repair models that are configured for different types of error and commands. A specific type of error identified by the error classifier 245 may cause the command modifier 255 to access a script repair model for the identified type of error. A specific type of command identified by the command classifier 240 may cause the command modifier 255 to access a script repair model for the identified type of command. The system may use neural networks and machine learning to generate and train the script repair models.

The command modifier 255 applies the script repair model to the data from the computer vision module 235, the command classifier 240, the error classifier 245, and the process analyzer 250. The command modifier 255 generates one or more candidate modifications. Following the example from FIGS. 1A and 1B, the candidate modifications may include cropping image 134c, lowering a threshold image score to identify the portion of the user interface 100c that best matches the image 134c, and performing optical character recognition on the image 134c and the user interface 100c. The command modifier 255 provides the candidate modifications to the modification scoring module 265 to generate a repair confidence score for each of the candidate modifications. The repair confidence score may reflect a likelihood that the candidate modification will correct the error in the script. The modification scoring module 265 may use data generated from applying the script repair models to generate the repair confidence scores.

In some implementations, the command modifier 255 may access a user interface generator 270 to propose the candidate modifications to the user. The user interface generator 270 may present the candidate modifications and request that the user select one of the candidate modifications. Alternatively or additionally, the user interface generator 270 may request that the user suggest a modification. Following the example from FIGS. 1A and 1B, the user may suggest that the command modifier 255 modify the script so that the script searches the user interface 100c for the term "contacts." In some implementations, the command modifier 255 may apply a modification to the command and execute the modified command. The user interface generator 270 may request confirmation from the user whether the modified command corrected the error. In some implementations, the command modifier may simulate the modified command using, in some instances, deep learning techniques or planning techniques or both.

In some implementations, the command modifier 255 accesses the modified command simulator 275. The modified command simulator 275 may be configured to simulate the candidate modifications. Following the example from FIGS. 1A and 1B, the modified command simulator 275 may be able to crop image 134c, lower a threshold image score to identify the portion of the user interface 100c that best matches the image 134c, and perform optical character recognition on the image 134c and the user interface 100c without modifying the script. The modified command simulator 275 may be configured to identify which of the simulated modified commands generate an error. The modified command simulator 275 may be able to simulate commands that the system 200 performs after the command that generated the error. For example, the modified command simulator 275 may simulate cropping the image 134c and simulate the subsequent actions of the script. The modified command simulator 275 may be able to identify any errors in subsequent actions. There may be instances where the modified command may not generate an error but subsequent actions generate error suggesting that the command modification may not have been the correct modification to repair the script.

The command modifier 255 selects one of the candidate modifications based on applying a script repair model and on data from the modification scoring module 265 and the user interface generator 270. In some implementations, the command modifier 255 receives additional data from the modified command simulator 275 and uses that data to select a modification. The command modifier 255 may select the candidate modification with the highest repair confidence score, the candidate modification selected by the user, or a candidate modification identified by the modified command simulator 275.

The command modifier 255 applies the modification to the command that generated the error and updates the script. The system 200 may execute the modified command and determine whether the modified command generates a new error. In some implementations, the command modifier 255 may identify other scripts with similar commands and apply the modification to those scripts. For example, the command modifier 255 may identify other scripts that search for images that include image 139d. The command modifier 255 may use computer vision techniques to identify the images. The command modifier 255 may modify the corresponding commands by cropping those images to be similar to image 139d.

Figure 3:
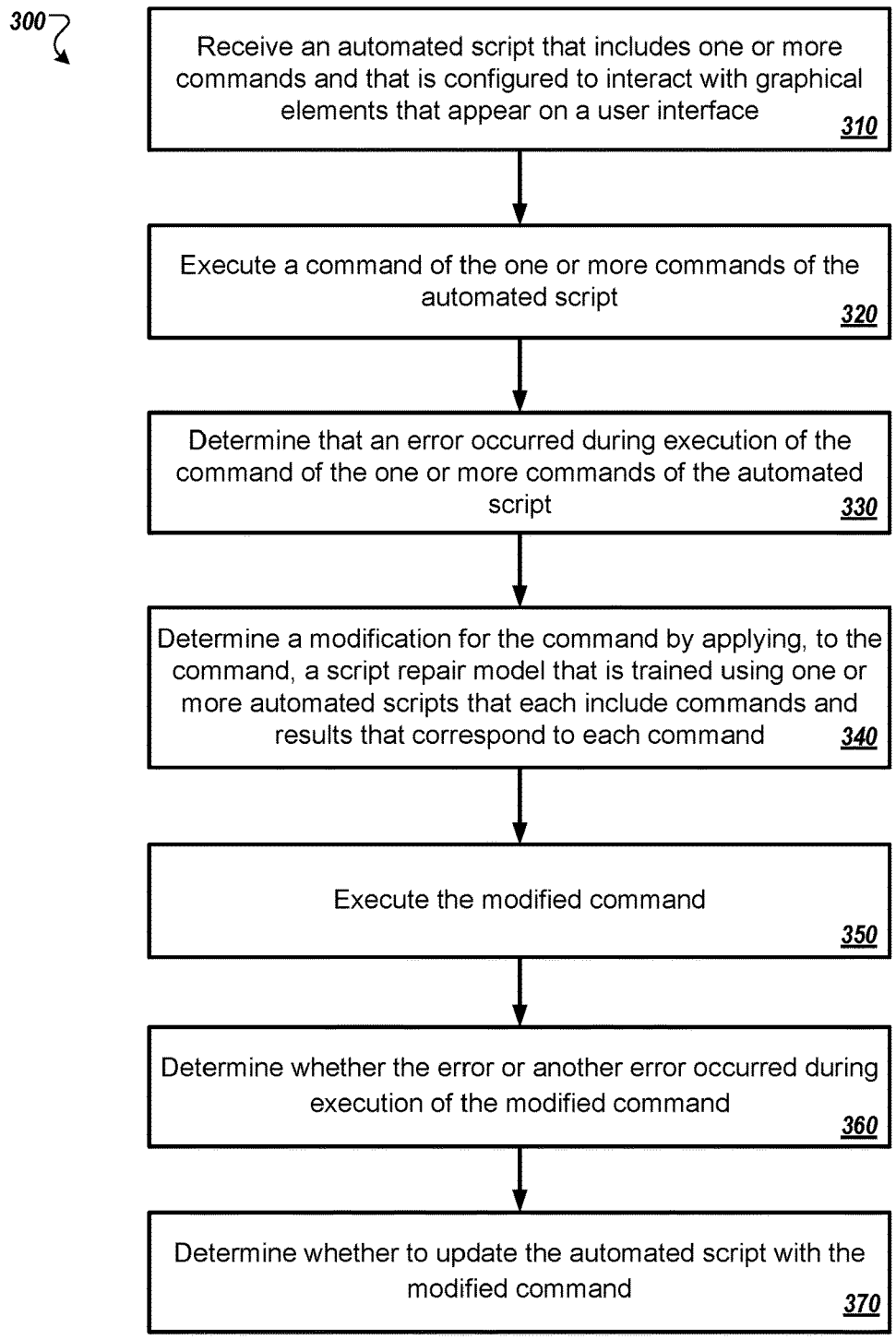
FIG. 3 illustrates an example process for capturing, executing, and modifying automated scripts.

FIG. 3 illustrates an example process 300 for capturing, executing, and modifying automated scripts. In general, the process 300 captures and executes automated scripts. In some instances, the automated script may generate an error. In those instances, the process 300 modifies the script to fix the error. The process 300 will be described as being performed by a computer system comprising one or more computers, for example, the system 200 as shown in FIG. 2.

The system receives an automated script that includes one or more commands and that is configured to interact with graphical elements that appear on a user interface (310). The script may include images for the system to match to corresponding portions of the user interface. For example, the script may include images of icons to select for opening a contacts application and accessing a particular contact. The scripts may be generated by a user requesting that the system record a script.

The system executes a command of the one or more commands of the automated script (320). In some implementations, the system analyzes using computer vision, a screen capture of the user interface. The system identifies, in the user interface, an area of the screen that likely matches a graphical element that is specified by the automated script. The system selects the area of the screen that matches the graphical element that is specified by the automated script. For example, the system may execute a command to identify and select a portion of the user interface that matches an image included in the script. The system determines that an error occurred during execution of the command of the one or more commands of the automated script (330). For example, the system may not be able to identify a portion of the user interface that matches an image included in the script.

The system, in response to determining that an error occurred during execution of the command, determines a modification for the command by applying, to the command, a script repair model that is trained using one or more automated scripts that each include commands and results that correspond to each command (340). In some implementations the system trains the script repair model using inputs provided by different users and across different systems. The system also trains the script repair model using results of those inputs. In some implementations, the script repair model uses neural networks and the system trains the script repair model using machine learning. In some implementations, the system learns the script repair model that describes a modification for an action. This script repair model may be, for example, a neural network or other machine learning algorithm. The system may use the script repair to simulate subsequent actions from any command. The system may use planning techniques on the script repair model to select a repair script or modification. In some implementations, the modification includes cropping an image included in the script and attempting to match the cropped image to the user interface.

In some implementations, the system determines for each of one or more candidate modifications, a repair confidence score that reflects a likelihood that applying a respective candidate modification to the command will correct the error. For example, the system may determine that the repair confidence score for cropping the image is 0.9 and the repair confidence score is 0.7 for selecting the portion of the user interface that best matches the image despite not generating an image match score that satisfies a threshold. The system may select the modification by selectin the modification with the highest repair confidence score.

In some implementations, the system classifies the command or the error that occurred during execution of the command of the one or more commands of the automated script. The system may apply a script repair model that matches the command type or error type. For example, the system may apply different script repair models for different commands such as selecting an icon with a mouse, selecting an icon by touching the screen, typing on the keyboard, scrolling the mouse, or clicking and dragging the mouse. In some implementations, the system may present the modification to the user and request confirmation. The system may receive confirmation and apply the modification.

The system executes the modified command (350). In some implementations, the system simulates the modified command. The system determines whether the error or another error occurred during execution of the modified command (360). In some implementations, the system determines whether the error or the other error occurred during simulation of the modified command.

The system based on determining whether the error or the other error occurred during execution of the modified command, determines whether to update the automated script with the modified command (370). In some implementations, the system determines that the error or another error occurred during execution of the modified command. In this instance, the system may determine not to update the automated script with the modified command. The system may determine an additional modification for the command based on the application of the script repair model to the command and retry the additional modification. In some implementations, the system updates the script repair model using data indicating that the error or the other error occurred during execution of the modified command. For example, the system may update the script repair model to prevent the script repair model from applying the modification to similar commands.

In some implementations, the system determines that the error or the other error did not occur during execution of the modified command. In this instance, the system may update the update the automated script with the modified command to indicate that the modification was successful. The system may update the script repair model with data indicating that the modification was successful. The system may also update other similar commands of other scripts with the modification.

Figure 4:
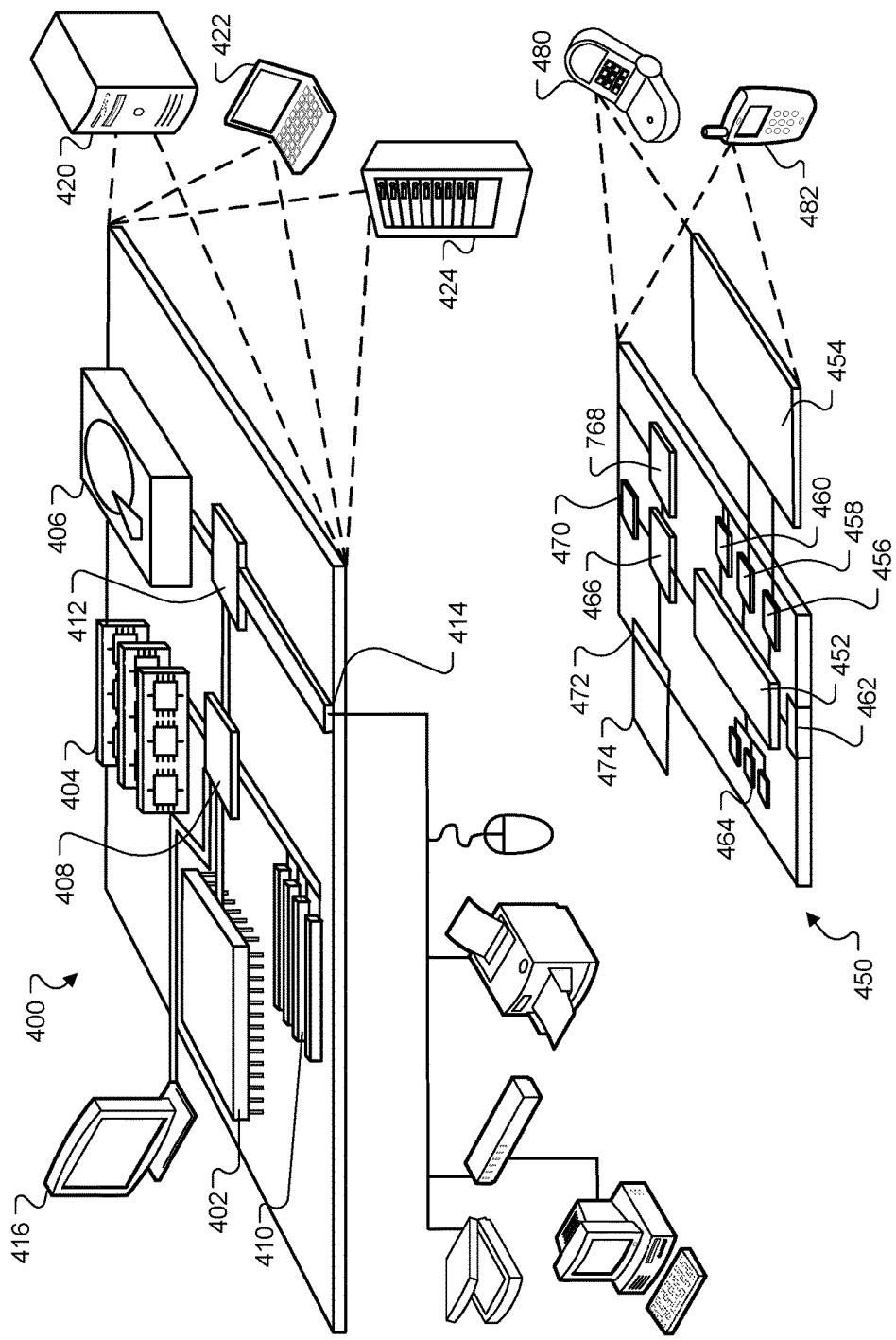
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by a script executor of a script repair system that includes (i) the script executor, (ii) an error detector, (iii) a command modifier, and (iv) a modified command simulator, an automated script that includes one or more commands and that is configured to interact with graphical elements that appear on a user interface on a display of a computer;
executing, by the script executor of the script repair system, a command of the one or more commands of the automated script;
during execution of the command of the one or more commands of the automated script, analyzing, using computer vision and by the script executor of the script repair system, pixels of a screen capture of the user interface on the display of the computer for pixels that match pixels of an image that corresponds to the command;
determining, by the error detector of the script repair system, that the pixels of the screen capture of the user interface on the display of the computer do not include the pixels of the image that corresponds to the command;
based on determining that the pixels of the screen capture of the user interface on the display of the computer do not include the pixels of the image that corresponds to the command, determining, by the error detector of the script repair system, that an error occurred during execution of the command of the one or more commands of the automated script;
in response to determining that an error occurred during execution of the command of the one or more commands of the automated script, cropping, by the command modifier of the script repair system, the image that corresponds to the command by removing a portion of the pixels of the image that corresponds to the command to match a group of the pixels of the screen capture of the user interface on the display of the computer;
executing, by the modified command simulator of the script repair system, the command by selecting the group of pixels of the screen capture of the user interface on the display of the computer that match the cropped image that corresponds to the command;
determining, by the error detector of the script repair system, that the error or another error did not occur during selection of the group of pixels of the screen capture of the user interface on the display of the computer that match the cropped image that corresponds to the command;
based on determining that the error or the other error did not occur during selection of the group of pixels of the screen capture of the user interface on the display of the computer that match the cropped image that corresponds to the command, updating, by the command modifier of the script repair system, the automated script with the cropped image; and
executing, by the script executor of the script repair system, the automated script with the cropped image.

2. The method of claim 1, comprising:
based on determining that the error or the other error did not occur during execution of the modified command, updating a script repair model using data indicating that the error or the other error did not occur during execution of the modified command.

3. The method of claim 1, comprising:
identifying another automated script that includes another image that is similar to the command of the automated script; and
updating the other image of the other automated script with the cropped image.

4. The method of claim 1, comprising:
classifying, by a script repair model, the error that occurred during execution of the command of the one or more commands of the automated script; and
based on the classification of the error, determining a modification for the command by applying, to the command, the script repair model.

5. The method of claim 4, comprising:
based on applying the script repair model to the command, determining for each of one or more candidate modifications, a repair confidence score that reflects a likelihood that applying a respective candidate modification to the command will correct the error; and based on the repair confidence scores, selecting, from among the one or more candidate modifications, the modification for the command.

6. The method of claim 4, comprising:

receiving one or more automated scripts that each include commands and results that correspond to each command; and training, using machine learning and the one or more automated scripts that each include commands and results that correspond to each command, the script repair model.

7. The method of claim 1, wherein:

executing the command by selecting the group of pixels of the screen capture of the user interface on the display of the computer that match the cropped image that corresponds to the command comprises:
simulating selection of the group of pixels of the screen capture, and determining whether the error or another error occurred during execution of the modified command comprises:
determining whether the error or the other error occurred during simulation of the selection of the group of pixels of the screen capture.

8. A system comprising:

one or more computers; and one or more storage devices storing instructions that are operable, when executed by the one or more computers, to cause the one or more computers to perform operations comprising:

receiving, by a script executor of a script repair system that includes (i) the script executor, (ii) an error detector, (iii) a command modifier, and (iv) a modified command simulator, an automated script that includes one or more commands and that is configured to interact with graphical elements that appear on a user interface on a display of a computer;

executing, by the script executor of the script repair system, a command of the one or more commands of the automated script;

during execution of the command of the one or more commands of the automated script, analyzing, using computer vision and by the script executor of the script repair system, pixels of a screen capture of the user interface on the display of the computer for pixels that match pixels of an image that corresponds to the command;

determining, by the error detector of the script repair system, that the pixels of the screen capture of the user interface on the display of the computer do not include the pixels of the image that corresponds to the command;

based on determining that the pixels of the screen capture of the user interface on the display of the computer do not include the pixels of the image that corresponds to the command, determining, by the error detector of the script repair system, that an error occurred during execution of the command of the one or more commands of the automated script;

in response to determining that an error occurred during execution of the command of the one or more commands of the automated script, cropping, by the command modifier of the script repair system, the image that corresponds to the command by removing a portion of the pixels of the image that corresponds to the command to match a group of the pixels of the screen capture of the user interface on the display of the computer;

executing, by the modified command simulator of the script repair system, the command by selecting the group of pixels of the screen capture of the user interface on the display of the computer that match the cropped image that corresponds to the command;

determining, by the error detector of the script repair system, that the error or another error did not occur during selection of the group of pixels of the screen capture of the user interface on the display of the computer that match the cropped image that corresponds to the command;

based on determining that the error or the other error did not occur during selection of the group of pixels of the screen capture of the user interface on the display of the computer that match the cropped image that corresponds to the command, updating, by the command modifier of the script repair system, the automated script with the cropped image; and executing, by the script executor of the script repair system, the automated script with the cropped image.

9. The system of claim 8, wherein the operations comprise:

based on determining that the error or the other error did not occur during execution of the modified command, updating a script repair model using data indicating that the error or the other error did not occur during execution of the modified command.

10. The system of claim 8, wherein the operations comprise:

identifying another automated script that includes another image that is similar to the command of the automated script; and updating the other image of the other automated script with the cropped image.

11. The system of claim 8, wherein the operations comprise:

classifying, by a script repair model, the error that occurred during execution of the command of the one or more commands of the automated script; and based on the classification of the error, determining a modification for the command by applying, to the command, the script repair model.

12. The system of claim 11, wherein the operations comprise:

based on applying the script repair model to the command, determining for each of one or more candidate modifications, a repair confidence score that reflects a likelihood that applying a respective candidate modification to the command will correct the error; and based on the repair confidence scores, selecting, from among the one or more candidate modifications, the modification for the command.

13. The system of claim 11, wherein the operations comprise:

receiving one or more automated scripts that each include commands and results that correspond to each command; and training, using machine learning and the one or more automated scripts that each include commands and results that correspond to each command, the script repair model.

14. The system of claim 8, wherein:

executing the command by selecting the group of pixels of the screen capture of the user interface on the display of the computer that match the cropped image that corresponds to the command comprises:
  simulating selection of the group of pixels of the screen capture, and
  determining whether the error or another error occurred during execution of the modified command comprises:
    determining whether the error or the other error occurred during simulation of the selection of the group of pixels of the screen capture.

15. A non-transitory computer-readable medium storing software comprising instructions executable by one or more computers which, upon such execution, cause the one or more computers to perform operations comprising:
  receiving, by a script executor of a script repair system that includes (i) the script executor, (ii) an error detector, (iii) a command modifier, and (iv) a modified command simulator, an automated script that includes one or more commands and that is configured to interact with graphical elements that appear on a user interface on a display of a computer;
  executing, by the script executor of the script repair system, a command of the one or more commands of the automated script;
  during execution of the command of the one or more commands of the automated script, analyzing, using computer vision and by the script executor of the script repair system, pixels of a screen capture of the user interface on the display of the computer for pixels that match pixels of an image that corresponds to the command;
  determining, by the error detector of the script repair system, that the pixels of the screen capture of the user interface on the display of the computer do not include the pixels of the image that corresponds to the command;
  based on determining that the pixels of the screen capture of the user interface on the display of the computer do not include the pixels of the image that corresponds to the command, determining, by the error detector of the script repair system, that an error occurred during execution of the command of the one or more commands of the automated script;
  in response to determining that an error occurred during execution of the command of the one or more commands of the automated script, cropping, by the command modifier of the script repair system, the image that corresponds to the command by removing a portion of the pixels of the image that corresponds to the command to match a group of the pixels of the screen capture of the user interface on the display of the computer;
  executing, by the modified command simulator of the script repair system, the command by selecting the group of pixels of the screen capture of the user interface on the display of the computer that match the cropped image that corresponds to the command;
  determining, by the error detector of the script repair system, that the error or another error did not occur during selection of the group of pixels of the screen capture of the user interface on the display of the computer that match the cropped image that corresponds to the command;
  based on determining that the error or the other error did not occur during selection of the group of pixels of the screen capture of the user interface on the display of the computer that match the cropped image that corresponds to the command, updating, by the command modifier of the script repair system, the automated script with the cropped image; and
  executing, by the script executor of the script repair system, the automated script with the cropped image.

16. The medium of claim 15, wherein the operations comprise:
  based on determining that the error or the other error did not occur during execution of the modified command, updating a script repair model using data indicating that the error or the other error did not occur during execution of the modified command.

17. The medium of claim 15, wherein the operations comprise:
  identifying another automated script that includes another image that is similar to the command of the automated script; and
  updating the other image of the other automated script with the cropped image.

18. The medium of claim 15, wherein the operations comprise:
  classifying, by a script repair model, the error that occurred during execution of the command of the one or more commands of the automated script; and
  based on the classification of the error, determining a modification for the command by applying, to the command, the script repair model.

19. The medium of claim 18, wherein the operations comprise:
  based on applying the script repair model to the command, determining for each of one or more candidate modifications, a repair confidence score that reflects a likelihood that applying a respective candidate modification to the command will correct the error; and
  based on the repair confidence scores, selecting, from among the one or more candidate modifications, the modification for the command.

20. The medium of claim 18, wherein the operations comprise:
  receiving one or more automated scripts that each include commands and results that correspond to each command; and
  training, using machine learning and the one or more automated scripts that each include commands and results that correspond to each command, the script repair model.

21. The medium of claim 15, wherein:
  executing the command by selecting the group of pixels of the screen capture of the user interface on the display of the computer that match the cropped image that corresponds to the command comprises:
    simulating selection of the group of pixels of the screen capture, and
  determining whether the error or another error occurred during execution of the modified command comprises:
    determining whether the error or the other error occurred during simulation of the selection of the group of pixels of the screen capture.

* * * * *